US010935977B2

(12) United States Patent
Prasad et al.

(10) Patent No.: US 10,935,977 B2
(45) Date of Patent: Mar. 2, 2021

(54) LANE ASSIGNMENT SYSTEM

(71) Applicant: Aptiv Technologies Limited, St. Michael (BB)

(72) Inventors: Premchand Krishna Prasad, Westfield, IN (US); Tanto Sugiarto, West Lafayette, IN (US); Matthew R. Smith, Springboro, OH (US)

(73) Assignee: Aptiv Technologies Limited, St. Michael (BB)

( * ) Notice: Subject to any disclaimer, the term of this patent is extended or adjusted under 35 U.S.C. 154(b) by 173 days.

(21) Appl. No.: 16/025,138

(22) Filed: Jul. 2, 2018

(65) Prior Publication Data

US 2020/0004246 A1 Jan. 2, 2020

Related U.S. Application Data

(60) Provisional application No. 62/691,323, filed on Jun. 28, 2018.

(51) Int. Cl.
*G05D 1/00* (2006.01)
*B60W 50/00* (2006.01)
(Continued)

(52) U.S. Cl.
CPC ....... *G05D 1/0088* (2013.01); *B60W 50/0098* (2013.01); *G05D 1/021* (2013.01);
(Continued)

(58) Field of Classification Search
CPC .............................................. B60W 30/18163
See application file for complete search history.

(56) References Cited

U.S. PATENT DOCUMENTS

2010/0076684 A1 3/2010 Schiffmann et al.
2016/0171893 A1 6/2016 Chen et al.
(Continued)

FOREIGN PATENT DOCUMENTS

DE 102016100718 7/2017
EP 1932742 6/2008

OTHER PUBLICATIONS

"Extended European Search Report", EP Application No. 19182026.5, dated Mar. 9, 2020, 9 pages.
(Continued)

*Primary Examiner* — Imran K Mustafa
(74) *Attorney, Agent, or Firm* — Colby Nipper PLLC

(57) ABSTRACT

A lane assignment system includes a digital-map, a ranging-sensor, and one or more controller-circuits. The digital-map indicates a position of a host-vehicle traveling in a travel-lane on a roadway. The ranging sensor detects a lateral-distance to an other-vehicle traveling on the roadway proximate the host-vehicle. The one or more controller-circuits are in communication with the digital-map and the ranging-sensor. The one or more controller-circuits determine a lateral-variation of the lateral-distance, determine whether the lateral-variation is greater than a dynamic-threshold, determine whether a second-lane exists beyond a first-lane based on the digital-map, determine that the other-vehicle is traveling in the first-lane, and operate the host-vehicle in accordance with the other-vehicle traveling in the first-lane.

20 Claims, 4 Drawing Sheets

(51) Int. Cl.
    *G05D 1/02* (2020.01)
    *B60W 30/18* (2012.01)
(52) U.S. Cl.
    CPC ............. *B60W 30/18163* (2013.01); *B60W 2050/0056* (2013.01); *B60W 2554/801* (2020.02); *G05D 2201/0213* (2013.01)

(56) References Cited

U.S. PATENT DOCUMENTS

2018/0122243 A1   5/2018   Prasad et al.
2019/0100200 A1*   4/2019   McNew ............... B60W 30/12

OTHER PUBLICATIONS

Adam, et al., "Probabilistic Road Estimation and Lane Association Using Radar Detections", Jul. 5, 2011, pp. 937-944, 8 pages.

* cited by examiner

LANE ASSIGNMENT SYSTEM

TECHNICAL FIELD OF INVENTION

This disclosure generally relates to a lane assignment system, and more particularly relates to a lane assignment system that determines whether an other-vehicle is in an adjacent-lane.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
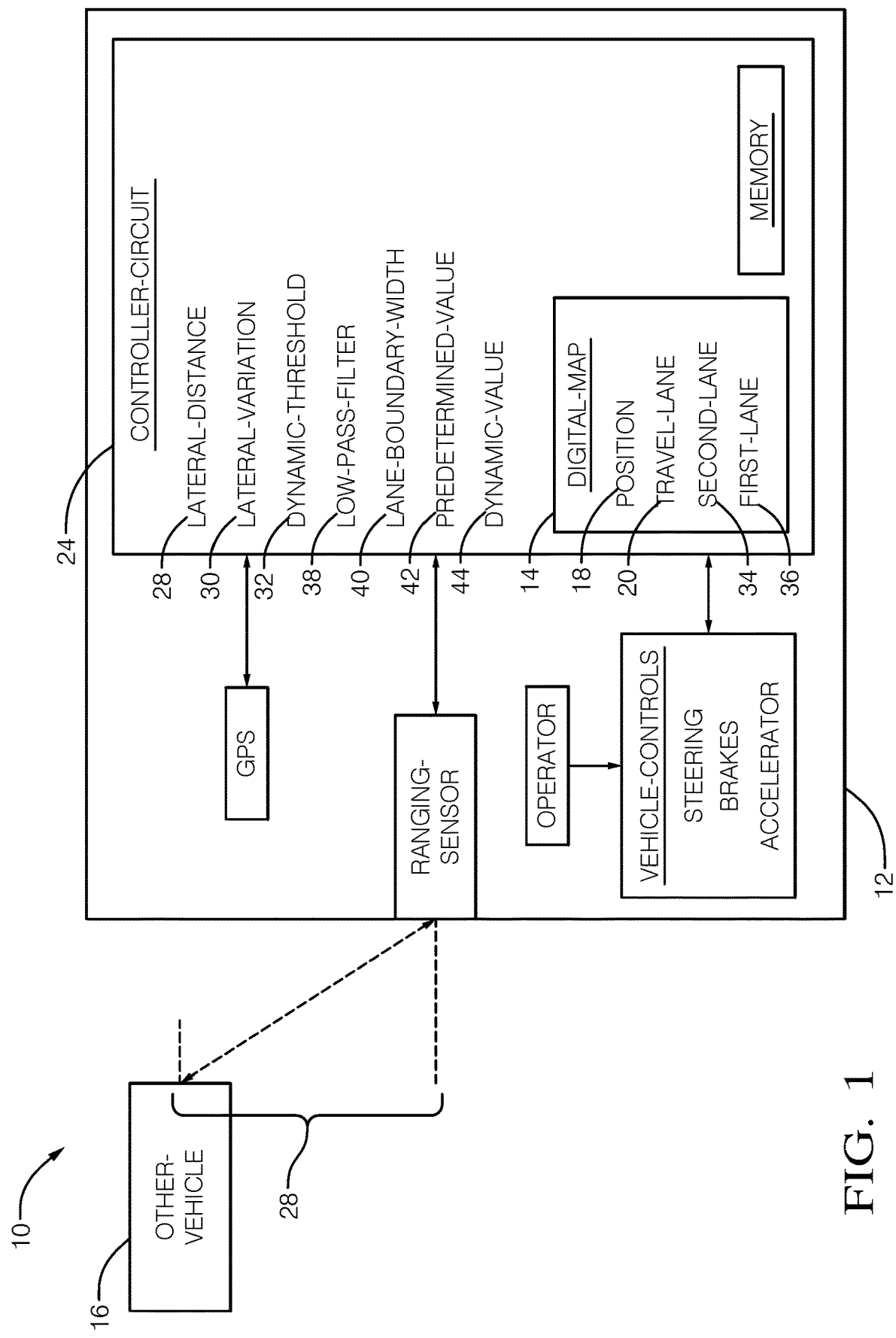
FIG. 1 is an illustration of a lane assignment system in accordance with one embodiment.

FIG. 1 illustrates a lane assignment system 10, hereafter referred to as the system 10, for use on an automated vehicle 12, hereafter referred to as a host-vehicle 12. As will be described in more detail below, the system 10 is an improvement on previous lane-assignment-systems because the system 10 uses a digital-map 14 to determine whether an other-vehicle 16 is traveling in an adjacent-lane that is adjacent to or next to a travel-lane presently traveled or occupied by the host-vehicle 12, which may be beneficial for automatic-lane-change features that may be installed on the host-vehicle 12.

The system 10 includes the digital-map 14 that indicates a position 18 of the host-vehicle 12 traveling in a travel-lane 20 on a roadway 22. As used herein, the position 18 is a global-positioning-system (GPS) coordinate of the host-vehicle 12. The digital-map 14 may be located on-board the host-vehicle 12 and may be integrated into one or more controller-circuits 24. The digital-map 14 may be stored 'in the cloud' and accessed via a transceiver (e.g. Wi-Fi, cellular, satellite—not shown). The digital-map 14 and transceiver may also be part of a location-device (e.g. GPS—not shown).

The system 10 also includes a ranging-sensor 26 that detects, but is not limited to detecting, a lateral-distance 28 to the other-vehicle 16 traveling on the roadway 22 proximate the host-vehicle 12. As used herein, the lateral-distance 28 is the distance between a host-vehicle-longitudinal-axis 29 and an other-vehicle-longitudinal-axis 31 measured normal to the host-vehicle-longitudinal-axis 29 (see FIGS. 2-3). The ranging-sensor 26 may be a radar-sensor or a lidar-sensor as will be understood by those in the art. In the example illustrated in FIG. 1, the ranging-sensor 26 is a radar-sensor. The radar-sensor may be configured to output a continuous or periodic data stream that includes a variety of signal characteristics associated with each target detected. The signal characteristics may include or be indicative of, but are not limited to, the range to the target from the host-vehicle 12, the azimuth-angle (not specifically shown) to the target relative to a host-vehicle-longitudinal-axis 29, an amplitude (not shown) of the radar-signal, and a relative-velocity of closure (i.e. a range-rate—not shown) relative to the target.

The system 10 also includes the one or more controller-circuits 24 in communication with the digital-map 14 and the ranging-sensor 26. The one or more controller-circuits 24 may include a processor (not specifically shown) such as a microprocessor or other control circuitry such as analog and/or digital control circuitry including an application specific integrated circuit (ASIC) for processing data as should be evident to those in the art. The one or more controller-circuits 24 may include a memory (not specifically shown), including non-volatile memory, such as electrically erasable programmable read-only-memory (EEPROM) for storing one or more routines, thresholds, and captured data. The one or more routines may be executed by the processor to perform steps for determining the lateral-distance 28 based on signals received by the ranging-sensor 26 as described herein.

The one or more controller-circuits 24 may analyze the radar-signal to categorize the data from each detected-target with respect to a list of previously detected-targets having established tracks. As used herein, a track refers to one or more data sets that have been associated with a particular instance of the detected-targets. By way of example and not limitation, if the amplitude of the radar-signal is greater than a predetermined amplitude threshold, then the one or more controller-circuits 24 determines if the data corresponds to a previously detected-target or if a new-target has been detected. If the data corresponds to a previously detected-target, the data is added to or combined with prior data to update the track of the previously detected-target. If the data does not correspond to any previously detected-target because, for example, it is located too far away from any previously detected-target, then it may be characterized as a new-target and assigned a unique track identification number. The identification number may be assigned according to the order that data for a new detected-target is received, or may be assigned an identification number according to a grid location in the field-of-view.

Figure 2:
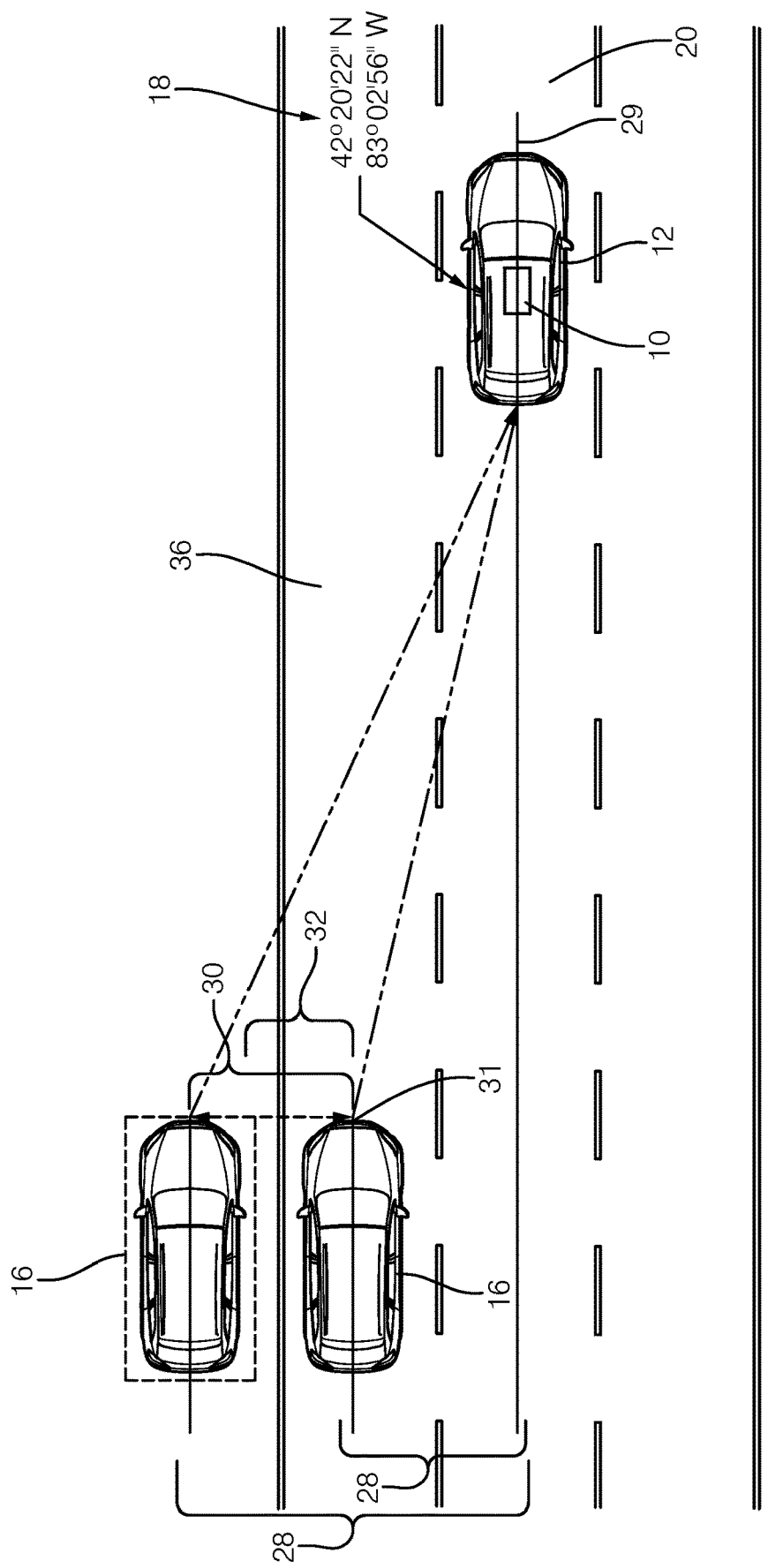
FIG. 2 is an illustration of a host-vehicle equipped with the lane assignment system of FIG. 1 in accordance with one embodiment.

FIG. 2 illustrates a traffic-scenario where the host-vehicle 12 is traveling in the travel-lane 20 of the roadway 22 and the other-vehicle 16 is traveling in another-lane and approaching from behind the host-vehicle 12. An important feature of an automated lane-changing-system is to determine whether a lane-change may be safely executed by the host-vehicle 12. Occasionally, target outputs from the tracker exhibit a large lateral-variation 30. That is, an object that is initially determined to be in the adjacent-lane, can appear to move back and forth from one lane to another-lane. This situation may lead to a false-negative input to a threat-assessment-algorithm (stored in the one or more controller-circuits 24—not shown) in making a decision when it is "safe" to make the automatic lane-change. That is, the host-vehicle 12 may falsely perceive that it is safe to perform a lane-change maneuver into the adjacent-lane, where the other-vehicle 16 is actually traveling in the adjacent-lane, increasing a risk of collision.

The one or more controller-circuits 24 determine the lateral-variation 30 of the lateral-distance 28 based on the signals received from the ranging-sensor 26, and determine whether the lateral-variation 30 is greater than a dynamic-threshold 32. A magnitude of the dynamic-threshold 32 may be dependent on a lane-width of the travel-lane 20 at the position 18 of host-vehicle 12. The lane-width may be measured by sensors installed on the host-vehicle 12 (such as vision-sensors), or may be included in the digital-map 14. The inventors have discovered that for the travel-lane 20 having a lane-width of 3.5-meters, the dynamic-threshold 32 of greater than 4-meters of lateral-variation 30 provides a sufficient balance between signal-noise and accuracy when determining the assignment of a particular lane.

The one or more controller-circuits 24 determine whether a second-lane 34 exists beyond a first-lane 36 based on the digital-map 14, where the first-lane 36 is characterized as being adjacent to the travel-lane 20 traveled by the host-vehicle 12 (i.e. the adjacent-lane). In accordance with the determination that the lateral-variation 30 is greater than the dynamic-threshold 32 and that the second-lane 34 does not exist (as illustrated in FIG. 2), the one or more controller-circuits 24 determine that the other-vehicle 16 is traveling in the first-lane 36 and operates the host-vehicle 12 in accordance with the other-vehicle 16 traveling in the first-lane 36. For example, the one or more controller-circuits 24 may prevent the host-vehicle 12 from making the lane-change maneuver to avoid a collision based on the other-vehicle's 16 speed, acceleration, and range in the first-lane 36.

In another embodiment, the one or more controller-circuits 24 apply a low-pass-filter 38 to the lateral-variation 30 when the other-vehicle 16 is determined to be traveling in the first-lane 36. This is beneficial because it reduces the large deviations detected by the tracker that may erroneously affect an average-value of the lateral-variation 30.

Figure 3:
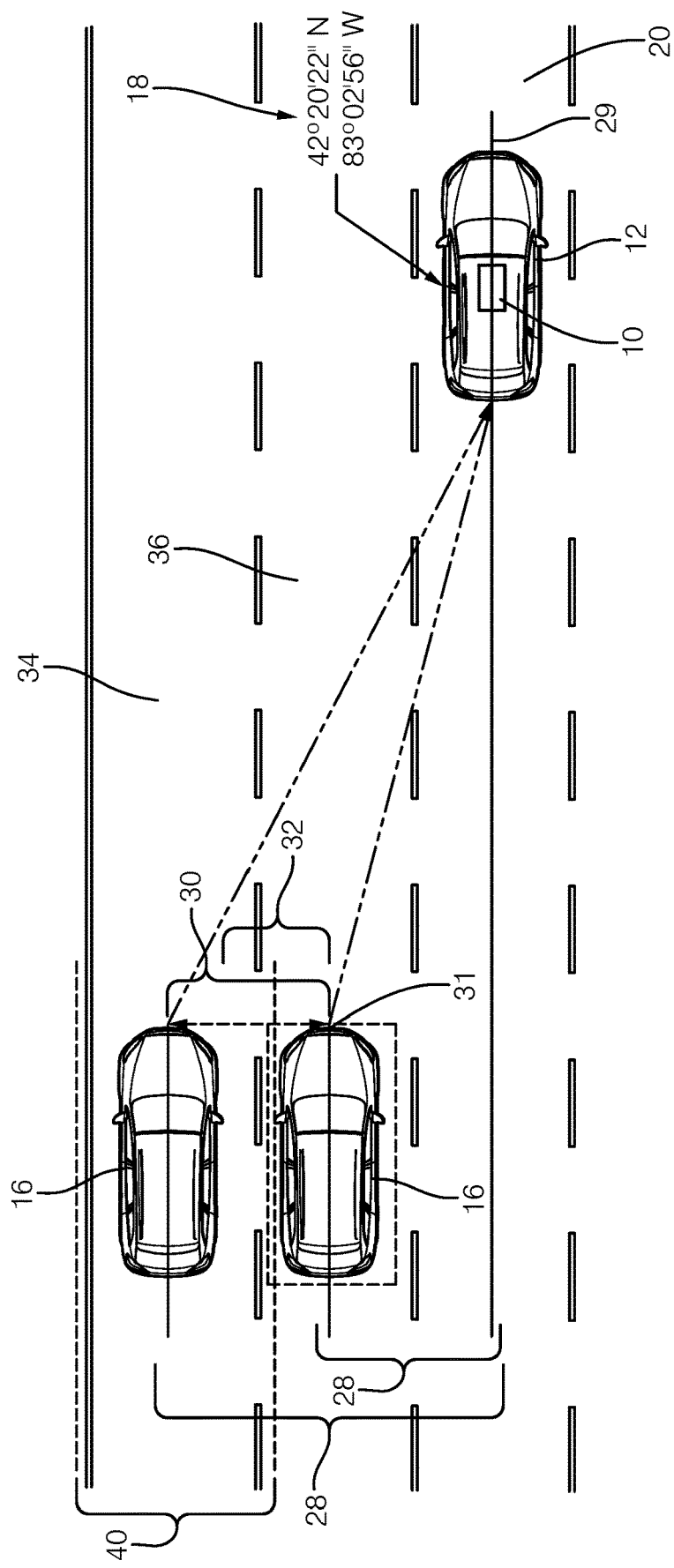
FIG. 3 is an illustration of a host-vehicle equipped with the lane assignment system of FIG. 1 in accordance with another embodiment.

FIG. 3 is another traffic-scenario that illustrates another embodiment of the system 10 of FIG. 1. In this traffic-scenario, the host-vehicle 12 is traveling in the travel-lane 20 of the roadway 22 and the other-vehicle 16 is traveling in another-lane and approaching from behind the host-vehicle 12. The one or more controller-circuits 24 determine the lateral-variation 30 of the lateral-distance 28 and determine whether the lateral-variation 30 is greater than the dynamic-threshold 32. The one or more controller-circuits 24 also determine whether a second-lane 34 exists beyond the first-lane 36 based on the digital-map 14, as described above. In accordance with the determination that the lateral-variation 30 is greater than the dynamic-threshold 32 and that the second-lane 34 does actually exist, the one or more controller-circuits 24 determine that the other-vehicle 16 is traveling in the second-lane 34 and operates the host-vehicle 12 in accordance with the other-vehicle 16 traveling in the second-lane 34. For example, the one or more controller-circuits 24 may permit the host-vehicle 12 to make the lane-change maneuver into the first-lane 36.

In another embodiment, the one or more controller-circuits 24 increases a lane-boundary-width 40 of the second-lane 34 by a predetermined-value 42 (0.5-meters, for example), when the other-vehicle 16 is determined to be traveling in the second-lane 34. In another embodiment, the one or more controller-circuits 24 increases the lane-boundary-width 40 of the second-lane 34 by a dynamic-value 44 when the other-vehicle 16 is determined to be traveling in the second-lane 34. Preferably, the dynamic-value 44 is a function of the lane-width of the travel-lane 20 at the position 18 of host-vehicle 12. Increasing the lane-boundary-width 40 of the second-lane 34 is beneficial because it reduces the likely false occurrences of detecting the other-vehicle 16 in the first-lane 36 when it is determined to be traveling in the second-lane 34.

Figure 4:
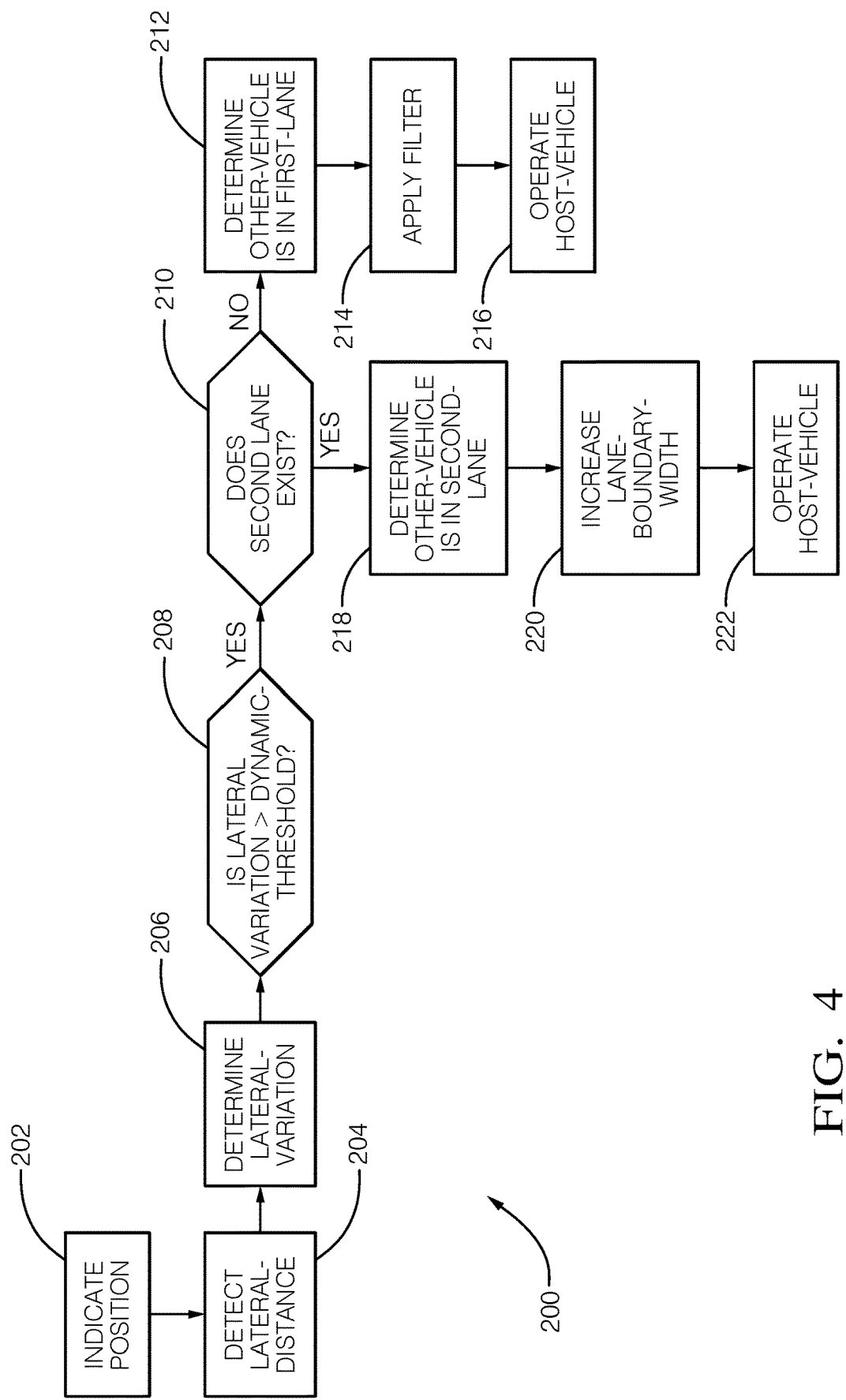
FIG. 4 is an illustration of a method of operating the lane assignment system of FIG. 1 in accordance with yet another embodiment.

FIG. 4 is a flow chart of yet another embodiment of a method 200 of operating a lane assignment system 10, hereafter referred to as the system 10.

Step 202, INDICATE POSITION, includes indicating a position 18 of a host-vehicle 12 traveling in a travel-lane 20 on a roadway 22 with a digital-map 14, using the system illustrated in FIG. 1. As used herein, the position 18 is a global-positioning-system (GPS) coordinate of the host-vehicle 12.

Step 204, DETECT LATERAL-DISTANCE, includes detecting a lateral-distance 28 to an other-vehicle 16 traveling on the roadway 22 proximate the host-vehicle 12 with a ranging-sensor 26, as described above. In the example illustrated in FIG. 1, the ranging-sensor 26 is a radar-sensor.

Step 206, DETERMINE LATERAL-VARIATION, includes determining, with one or more controller-circuits 24 in communication with the digital-map 14 and the ranging-sensor 26, a lateral-variation 30 of the lateral-distance 28, as described above. Occasionally, target outputs from the tracker exhibit a large lateral-variation 30 where an object that is initially determined to be in the adjacent-lane, can appear to move back and forth from one lane to another-lane.

Step 208, IS LATERAL-VARIATION GREATER THAN DYNAMIC-THRESHOLD?, includes determining whether the lateral-variation 30 is greater than a dynamic-threshold 32. A magnitude of the dynamic-threshold 32 depends on a lane-width of the travel-lane 20 at the position 18 of host-vehicle 12. The inventors have discovered that for the typical travel-lane 20 having a lane-width of 3.5-meters, the dynamic-threshold 32 of greater than 4-meters of lateral-variation 30 provides a sufficient balance between signal-noise and accuracy when assigning the other-vehicle 16 to a particular lane.

Step 210, DOES SECOND-LANE EXIST?, includes determining whether a second-lane 34 exists beyond a first-lane 36 based on the digital-map 14, the first-lane 36 characterized as being adjacent to the travel-lane 20.

Step 212, DETERMINE OTHER-VEHICLE IS IN FIRST-LANE, includes determining that the other-vehicle 16 is traveling in the first-lane 36 in accordance with the determination that the lateral-variation 30 is greater than the dynamic-threshold 32 and that the second-lane 34 does not exist based on the digital-map 14, as described above.

Step 214, APPLY FILTER, includes applying a low-pass-filter 38 to the lateral-variation 30 when the other-vehicle 16 is determined to be traveling in the first-lane 36, as described above.

Step 216, OPERATE HOST-VEHICLE, includes operating the host-vehicle 12 in accordance with the other-vehicle 16 traveling in the first-lane 36, and may prevent the host-vehicle 12 from making a lane-change maneuver into the first-lane 36, as described above.

Step 218, DETERMINE OTHER-VEHICLE IS IN SECOND-LANE, includes determining that the other-vehicle 16 is traveling in the second-lane 34 in accordance with the determination that the lateral-variation 30 is greater than the dynamic-threshold 32 and that the second-lane 34 actually exists, based on the digital-map 14.

Step, 220, INCREASE LANE-BOUNDARY-WIDTH, includes increasing a lane-boundary-width 40 of the second-lane 34 by a predetermined-value 42 (0.5-meters, for example), when the other-vehicle 16 is determined to be traveling in the second-lane 34. In another embodiment, the one or more controller-circuits 24 increases the lane-boundary-width 40 of the second-lane 34 by a dynamic-value 44 when the other-vehicle 16 is determined to be traveling in the second-lane 34. Preferably, the dynamic-value 44 is a function of the lane-width of the travel-lane 20 at the position 18 of host-vehicle 12.

Step 222, OPERATE HOST-VEHICLE, includes operating the host-vehicle 12 in accordance with the other-vehicle 16 traveling in the second-lane 34, may permit the host-vehicle 12 to make the lane-change maneuver into the first-lane 36, as described above.

Accordingly, a lane assignment system 10 (the system 10), and a method 200 of operating the lane assignment system 10, are provided. The system 10 is an improvement over other lane-assignment-systems because the system 10 uses a digital-map 14 to determine whether the other-vehicle 16 is traveling in the adjacent-lane, and may prevent the host-vehicle 12 from making the lane-change maneuver into the adjacent-lane to avoid the collision.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A lane assignment system, the system comprising:
a digital map configured to indicate a position of a host vehicle traveling in a travel lane on a roadway;
a ranging sensor configured to detect a lateral distance to another vehicle traveling on the roadway proximate the host vehicle; and
one or more controller circuits operably connected to the digital map and the ranging sensor, the one or more controller circuits configured to:
  determine, based on comparing the lateral distance to the other vehicle with one or more previously-detected lateral distances of nearby vehicles, whether the other vehicle was previously detected or not detected by the ranging sensor;
  responsive to a determination that the other vehicle was previously detected by the ranging sensor, add the lateral distance to a track corresponding to the other vehicle, the track comprising a data set of previously-detected lateral distances of the other vehicle;
  determine, by comparing the lateral distance to the other vehicle with a previously-detected lateral distance of the other vehicle, a lateral variation of the lateral distance;
  determine whether the lateral variation is greater or not greater than a dynamic threshold, the dynamic threshold being dependent on a lane width of the travel lane at the position of the host vehicle;
  determine whether a second lane exists beyond a first lane based on the digital map, the first lane characterized as being adjacent to the travel lane and the second lane not being the travel lane;
  responsive to a determination that the lateral variation is greater than the dynamic threshold and that the second lane does not exist, determine that the other vehicle is traveling in the first lane; and
operate the host vehicle in accordance with the other vehicle traveling in the first lane.

2. The system in accordance with claim 1, wherein the lane width of the travel lane is measured by a vision sensor installed on the host vehicle.

3. The system in accordance with claim 1, wherein the dynamic threshold is greater than four meters of lateral variation.

4. The system in accordance with claim 1, wherein the one or more controller circuits is further configured to apply a low-pass filter to the lateral variation when the other vehicle is determined to be traveling in the first lane.

5. The system in accordance with claim 1, the one or more controller circuits further configured to:
responsive to a determination that the other vehicle was not previously detected by the ranging sensor, generate a new track corresponding to the other vehicle.

6. A lane assignment system, the system comprising:
a digital map configured to indicate a position of a host vehicle traveling in a travel lane on a roadway;
a ranging sensor configured to detect a lateral distance to another vehicle traveling on the roadway proximate the host vehicle; and
one or more controller circuits operably connected to the digital map and the ranging sensor, the one or more controller circuits configured to:
  determine, based on comparing the lateral distance to the other vehicle with one or more previously-detected lateral distances of nearby vehicles, whether the other vehicle was previously detected or not detected by the ranging sensor;
  responsive to a determination that the other vehicle was previously detected by the ranging sensor, add the lateral distance to a track corresponding to the other vehicle, the track comprising a data set of previously-detected lateral distances of the other vehicle;

determine, by comparing the lateral distance to the other vehicle with a previously-detected lateral distance of the other vehicle, a lateral variation of the lateral distance;

determine whether the lateral variation is greater or not greater than a dynamic threshold, the dynamic threshold being dependent on a lane width of the travel lane at the position of the host vehicle;

determine whether a second lane exists beyond a first lane based on the digital map, the first lane characterized as being adjacent to the travel lane and the second lane not being the travel lane;

responsive to a determination that the lateral variation is greater than the dynamic threshold and that the second lane exists, determine that the other vehicle is traveling in the second lane; and operate the host vehicle in accordance with the other vehicle traveling in the second lane.

7. The system in accordance with claim 6, wherein the lane width of the travel lane is measured by a vision sensor installed on the host vehicle.

8. The system in accordance with claim 6, wherein the dynamic threshold is greater than four meters of lateral variation.

9. The system in accordance with claim 6, wherein the one or more controller circuits is further configured to increase a lane boundary width of the second lane by a predetermined value when the other vehicle is determined to be traveling in the second lane.

10. The system in accordance with claim 6, wherein the one or more controller circuits is further configured to increase a lane boundary width of the second lane by a dynamic value when the other vehicle is determined to be traveling in the second lane.

11. A method of operating a lane assignment system, the method comprising:

indicating, using a digital map, a position of a host vehicle traveling in a travel lane on a roadway;

detecting, using a ranging sensor, a lateral distance to another vehicle traveling on the roadway proximate the host vehicle;

determining, based on comparing the lateral distance to the other vehicle with one or more previously-detected lateral distances of nearby vehicles, whether the other vehicle was previously detected or not detected by the ranging sensor;

responsive to determining that the other vehicle was previously detected by the ranging sensor, adding the lateral distance to a track corresponding to the other vehicle, the track comprising a data set of previously-detected lateral distances of the other vehicle;

determining, using one or more controller circuits operably connected to the digital map and the ranging sensor and by comparing the lateral distance to the other vehicle with a previously-detected lateral distance of the other vehicle, a lateral variation of the lateral distance;

determining whether the lateral variation is greater or not greater than a dynamic threshold, the dynamic threshold is being dependent on a lane width of the travel lane at the position of the host vehicle;

determining whether a second lane exists beyond a first lane based on the digital map, the first lane character-ized as being adjacent to the travel lane and the second lane not being the travel lane;

responsive to determining that the lateral variation is greater than the dynamic threshold and that the second lane does not exist, determining that the other vehicle is traveling in the first lane; and operating the host vehicle in accordance with the other vehicle traveling in the first lane.

12. The method in accordance with claim 11, wherein the lane width of the travel lane is measured by a vision sensor installed on the host vehicle.

13. The method in accordance with claim 11, wherein the dynamic threshold is greater than four meters of lateral variation.

14. The method in accordance with claim 11, the method further comprising:

applying a low-pass filter, using the one or more controller circuits, to the lateral variation when the other vehicle is determined to be traveling in the first lane.

15. The method in accordance with claim 11, the method further comprising:

responsive to determining that the other vehicle was not previously detected by the ranging sensor, generating a new track corresponding to the other vehicle.

16. A method of operating a lane assignment system, the method comprising:

indicating, using a digital map, a position of a host vehicle traveling in a travel lane on a roadway;

detecting, using a ranging sensor, a lateral distance to another vehicle traveling on the roadway proximate the host vehicle;

determining, based on comparing the lateral distance to the other vehicle with one or more previously-detected lateral distances of nearby vehicles, whether the other vehicle was previously detected or not detected by the ranging sensor;

responsive to determining that the other vehicle was previously detected by the ranging sensor, adding the lateral distance to a track corresponding to the other vehicle, the track comprising a data set of previously-detected lateral distances of the other vehicle;

determining, using one or more controller circuits operably connected to the digital map and the ranging sensor and by comparing the lateral distance to the other vehicle with a previously-detected lateral distance of the other vehicle, a lateral variation of the lateral distance;

determining whether the lateral variation is greater or not greater than a dynamic threshold, the dynamic threshold is being dependent on a lane width of the travel lane at the position of the host vehicle;

determining whether a second lane exists beyond a first lane based on the digital map, the first lane characterized as being adjacent to the travel lane and the second lane not being the travel lane;

responsive to determining that the lateral variation is greater than the dynamic threshold and that the second lane exists, determining that the other vehicle is traveling in the second lane; and operating the host vehicle in accordance with the other vehicle traveling in the second lane.

17. The method in accordance with claim 16, wherein the lane width of the travel lane is measured by a vision sensor installed on the host vehicle.

18. The method in accordance with claim 16, wherein the dynamic threshold is greater than four meters of lateral variation.

19. The method in accordance with claim 16, further comprising:

increasing, by the one or more controller circuits, a lane boundary width of the second lane by a predetermined value.

20. The method in accordance with claim 16, further comprising:

increasing, by the one or more controller circuits, a lane boundary width of the second lane by a dynamic value.

\* \* \* \* \*